(12) United States Patent
Murawski et al.

(10) Patent No.: US 8,613,190 B2
(45) Date of Patent: Dec. 24, 2013

(54) PRESSURE VESSELS FOR HIGH TEMPERATURE APPLICATIONS AND A METHOD FOR THEIR MANUFACTURE

(75) Inventors: Bernd Murawski, Augsburg (DE); Helmut Maierhofer, Freising (DE)

(73) Assignee: MT Aerospace AG, Augsburg (DE)

( * ) Notice: Subject to any disclaimer, the term of this patent is extended or adjusted under 35 U.S.C. 154(b) by 894 days.

(21) Appl. No.: 12/611,185

(22) Filed: Nov. 3, 2009

(65) Prior Publication Data
US 2010/0108691 A1    May 6, 2010

(30) Foreign Application Priority Data
Nov. 3, 2008  (DE) .......................... 10 2008 054 293

(51) Int. Cl.
*F02K 9/00*    (2006.01)
(52) U.S. Cl.
USPC ............................................. 60/255; 220/591
(58) Field of Classification Search
USPC ........ 220/586, 581, 590, 591, 560.11; 60/255
See application file for complete search history.

(56) References Cited

U.S. PATENT DOCUMENTS

| | | | | |
|---|---|---|---|---|
| 3,017,746 A | * | 1/1962 | Kiphart | 60/255 |
| 3,022,735 A | * | 2/1962 | Eberle | 102/288 |
| 3,301,785 A | | 1/1967 | Ratliff et al. | |
| 3,347,047 A | | 10/1967 | Hartz et al. | |
| 3,686,868 A | * | 8/1972 | Chase et al. | 60/200.1 |
| 3,690,101 A | * | 9/1972 | Lynch | 60/255 |
| 3,716,604 A | | 2/1973 | Dehm | |
| 3,765,177 A | * | 10/1973 | Ritchey et al. | 60/253 |
| 3,811,358 A | * | 5/1974 | Morse | 86/20.1 |
| 3,973,397 A | * | 8/1976 | Chase et al. | 60/253 |
| 4,157,357 A | * | 6/1979 | Mine et al. | 528/31 |
| 4,366,917 A | * | 1/1983 | Kotcharian | 220/560.06 |
| 4,428,998 A | * | 1/1984 | Hawkinson | 442/263 |
| 4,458,483 A | | 7/1984 | Vetter | |
| 4,458,595 A | * | 7/1984 | Gerrish et al. | 102/290 |
| 4,817,890 A | | 4/1989 | Coffinberry | |
| 4,821,511 A | * | 4/1989 | Felix et al. | 60/255 |
| 4,911,795 A | * | 3/1990 | Olliff, Jr. | 205/70 |
| 4,956,971 A | * | 9/1990 | Smith | 60/245 |
| 5,011,721 A | * | 4/1991 | Decker et al. | 428/36.9 |
| 5,038,561 A | * | 8/1991 | Chase | 60/254 |
| 5,103,637 A | * | 4/1992 | Itoh et al. | 60/253 |

(Continued)

FOREIGN PATENT DOCUMENTS

| | | | |
|---|---|---|---|
| EP | 0447349 A1 | 9/1991 | |
| EP | 0635672 A1 | 1/1995 | |

(Continued)

OTHER PUBLICATIONS

Bobinage de fibres continues imprégnées de résine thermoplastique, Composites No. 3, May/Jun. 1986, pp. 121-128.

*Primary Examiner* — Anthony Stashick
*Assistant Examiner* — Christopher McKinley
(74) *Attorney, Agent, or Firm* — Rothwell, Figg, Ernst & Manbeck, P.C.

(57) ABSTRACT

The invention relates to a pressure vessel consisting of a housing and an insulating layer lining the inner surface of the housing. The housing is formed from a fiber composite material which has a high mechanical and thermal resistance and the insulating layer is formed from a gas-tight silicone elastomer, with the housing and the insulating layer being bonded to each other. The invention also relates to a method for the manufacture of such pressure vessels.

11 Claims, 1 Drawing Sheet

(56) References Cited

U.S. PATENT DOCUMENTS

Figure 1:
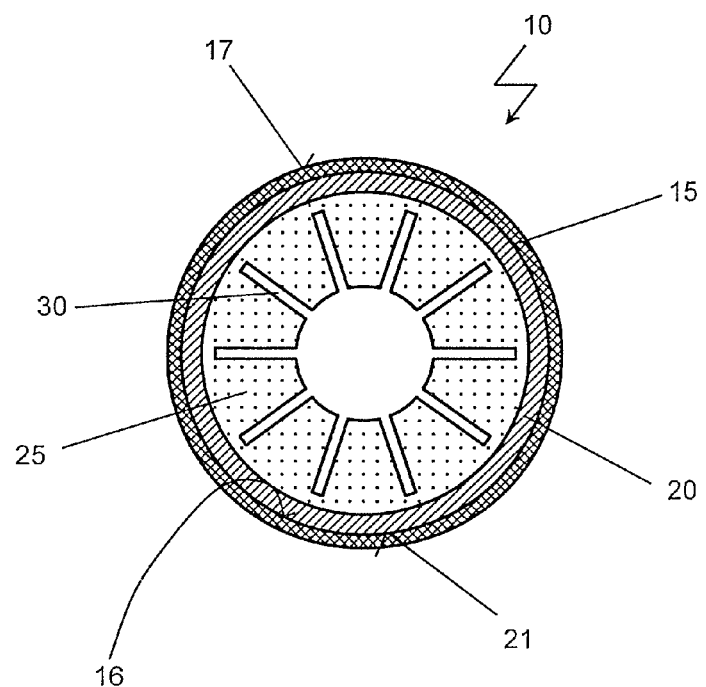

| | | | |
|---|---|---|---|
| 5,212,944 A * | 5/1993 | Martin et al. | 60/253 |
| 5,287,988 A * | 2/1994 | Murray | 220/589 |
| 5,348,603 A * | 9/1994 | Yorgason | 156/191 |
| 5,356,499 A * | 10/1994 | Decker et al. | 156/175 |
| 5,380,570 A * | 1/1995 | Sayles | 428/36.4 |
| 5,383,567 A * | 1/1995 | Sorathia et al. | 220/4.13 |
| 5,545,278 A * | 8/1996 | Chen et al. | 156/175 |
| 5,593,770 A * | 1/1997 | Mumford et al. | 442/327 |
| 5,648,407 A * | 7/1997 | Goetz et al. | 523/213 |
| 5,763,027 A * | 6/1998 | Enders et al. | 428/34.7 |
| 6,090,465 A * | 7/2000 | Steele et al. | 428/102 |
| 6,607,617 B1 * | 8/2003 | Hughes et al. | 149/19.8 |
| 6,893,597 B2 * | 5/2005 | Guillot | 264/267 |
| 7,032,769 B2 * | 4/2006 | Iida et al. | 220/591 |
| 7,410,607 B2 * | 8/2008 | Guillot | 264/241 |
| 7,641,949 B2 * | 1/2010 | DeLay et al. | 428/35.5 |
| 7,767,746 B2 * | 8/2010 | Gajiwala | 524/442 |
| 2004/0149759 A1 * | 8/2004 | Moser et al. | 220/581 |
| 2005/0028514 A1 * | 2/2005 | Guillot | 60/204 |
| 2007/0075085 A1 * | 4/2007 | Arnold et al. | 220/560.04 |
| 2007/0205201 A1 * | 9/2007 | Cundiff et al. | 220/591 |
| 2008/0223857 A1 * | 9/2008 | Palley et al. | 220/560.01 |

FOREIGN PATENT DOCUMENTS

| | | |
|---|---|---|
| EP | 13817807 B1 | 1/2004 |
| GB | 1441240 | 6/1976 |
| WO | 9012982 A1 | 11/1990 |
| WO | 9014553 A1 | 11/1990 |
| WO | 02086379 A1 | 10/2002 |

* cited by examiner

PRESSURE VESSELS FOR HIGH TEMPERATURE APPLICATIONS AND A METHOD FOR THEIR MANUFACTURE

The present invention relates to pressure vessels for high temperature applications and a method for their manufacture. The pressure vessels according to the invention are, due to their properties and qualities, for example, suitable for gas bottles but are particularly suitable as solid fuel combustion chambers of guided or cruise missiles (LFK=Lenkflugkörper) for example.

The invention is explained in the following mainly with reference to solid fuel combustion chambers. However, the invention should not be restricted to that but can apply to any vessels under pressure which are, or could be, exposed to very high mechanical and thermal stresses.

Furthermore, the term "pressure vessel(s)" in the context of the present invention should not be taken to exclusively mean a self-contained system but should also include part of such a pressurised system, such as pipelines, gas bottles or combustion chambers, especially for solid fuel.

Thus, for example, a guided missile (LFK) must on one hand withstand very high acceleration forces and on the other hand enormous temperature stresses. These high temperatures occur not just in the inside of the combustion chambers due to the combustion of the solid fuel but also on the outer skin of the guided missiles. The high temperatures on the outer skin occur due to the air friction generated by the high operating speeds in the supersonic range.

In prior art there are various approaches to solving this problem.

In this connection, a rocket engine is described in U.S. Pat. No. 3,973,397, which consists of a metal housing and an insulating layer attached to the inside by adhesive. The insulating layer serves mainly to absorb the heat generated by the combustion of the rocket fuel, in order to protect the metal housing. The insulating layer is formed from EPDM (ethylene-propylene diene rubber). However, a metal housing does not meet the requirement for a lightweight rocket engine.

From U.S. Pat. No. 5,348,603, a further design of a rocket engine is known, which consists of a metal housing and a fibre composite material lining the inner surface of the metal housing. The liner with the fibre composite material forms a hybrid structure together with the metal housing and thus replaces a housing formed completely of metal.

Such a metal/fibre composite hybrid structure is, however, still very heavy because of the existing outer metal skin. The fibre composite material according to U.S. Pat. No. 5,348,603 is furthermore formed at a curing temperature of approximately 149° C., which permits only comparatively low operating temperatures.

Furthermore, guided missiles are already known from the ASRAAM or VTI projects whose combustion chambers are constructed from a carbon fibre reinforced plastic (CFK) housing and an inner insulation. The inner insulation consists of fibre reinforced EPDM (ethylene-propylene diene rubber) in the form of rubber mats into which short fibres are incorporated. The matrix of the CFK is formed in the normal manner from a thermosetting epoxide resin system. This means that the properties of these materials permit operation of the guided missiles only up to an average temperature of approximately 160° C.

The average temperature in this case is the average value of the temperature pattern or profile from the outer surface of a combustion chamber housing to its inner surface. It is, of course, possible that momentary local temperature spikes of up to 400° C. can occur on the outer skin of the combustion chambers. Higher possible operating temperatures are therefore desirable for a safe operation of guided missiles.

Against the background of this prior art, it is the object of the present invention to provide a design for pressure vessels, especially for combustion chambers, for example of guided missiles, which satisfies the stringent demands for an ability to withstand mechanical and thermal stresses combined with lightweight. The disadvantages and problems which occur with prior art are to be eliminated.

The inventive step thus refers essentially to the outer casing and the construction of the insulating layer of a pressure vessel lying within said outer casing, especially of a combustion chamber for a guided missile or similar.

The object of the present invention is therefore a pressure vessel consisting of a housing and an insulating layer lining the inner surface of the housing, which is characterised in that the housing is formed from a fibre composite material which has high mechanical and thermal resistance and the insulating layer is formed from a gas-tight silicone elastomer and with the housing and insulating layer being bonded to each other.

The outer casing of a pressure vessel of this kind is therefore formed of fibre reinforced plastic, thus completely fulfilling the requirement that the object be lightweight.

A determining factor which up to now has not enabled this light weight to be achieved is the use of a suitable high temperature matrix in which the fibres are incorporated. The choice of the fibre composite material used in accordance with the invention, especially the resin matrix, could solve this problem. The requirement for stability of the housing even in high temperature operation can also therefore be met.

In order to protect the fibre composite housing from the high temperatures, which occur in the inside of the combustion chamber due to the combustion of the solid fuel, according to the invention a liner of a gas-tight silicone elastomer is provided as an insulating layer. In addition to the insulating function, a silicone liner of this kind has the advantage that a far higher temperature than previously can be used as the curing temperature of the resin system for the outer casing (the housing) of fibre reinforced synthetic resin. This results in comparatively higher possible operating temperatures of the pressure vessels.

A further advantage of this silicone liner is its flexibility. This flexibility has a positive effect in two ways on the quality of a pressure vessel provided with it, as follows:

1. During charging, the fuel, embedded in a plastic, is poured in liquid form at room temperature into the combustion chamber. As this plastic or resin hardens, a shrinkage of the charged fuel mass takes place.
   The insulating layer of silicone elastomer used according to the invention is able to compensate for this shrinkage and thus prevent that an air gap occurs between the fuel, the silicone liner and the inside of the housing. An air gap between the individual layers is absolutely to be avoided because this could cause the combustion properties of the fuel to become uncontrollable. An uncontrolled combustion can lead to an abrupt pressure rise in a combustion chamber and destroy a guided missile.
2. Fibres which have been wound in the outer area, i.e. later, over the silicone covering become increasingly loose the further out they lie. Due to the thermal expansion of the silicone covering during the curing of the fibre composite matrix, these fibres become pre-stressed. This effect leads to a finished component which can more effectively absorb a load introduction.

Due to the combination of a housing of a fibre composite material with a high mechanical and thermal resistance with a liner of a gas-tight silicone elastomer as an insulating layer according to the invention, a combustion chamber housing for guided missiles can be provided which can be operated at an average temperature of 200° C. and above. This not only increases the possible operating temperatures for a guided missile but also the operating speeds and operating duration, and therefore the range.

Particular and preferred embodiments of the pressure vessel according to the invention are given in subclaims 2 to 10.

The fibre composite material is thus constructed from mechanical and thermal high-strength reinforced fibres in a resin matrix with a high mechanical and thermal resistance. If both the fibres and the matrix consist of special high-temperature resistant materials, these mutually reinforce their positive effect with respect to high temperature operation.

Fibres of glass, silicone carbide, mullite, boron carbide, aramid and/or carbon aramid fibres are preferred, with carbon fibres being particularly preferred. This list is not to be regarded as conclusive.

The resin forming the resin matrix is preferably a thermosetting resin and preferably a polyphenol cyanate. A high temperature resin of this kind is, for example, available from Lonza under the name Primaset® PT-30.

A fibre composite material with a ceramic matrix, for example based on silicone carbide, aluminium oxide, mullite or carbon with a suitable manufacturing concept is also conceivable.

The gas-tight silicone elastomer is preferably a peroxide cross-linking material with an IRHD hardness of 85 and an expansion of 120%. It could be reinforced with fibres, for example aramid fibres. However, according to the invention, a filling with powdered silica or also glass, ceramic, flame retardant means, metal, etc., is preferred. It is filled in such a way that it still has an expansibility of at least 3%. The inclusion of aramid fibres or powdered silica, etc., further increases the high temperature resistance and mechanical strength of the silicone elastomer.

The geometry of the pressure vessel according to the invention is not particularly restricted. Due to the application areas of gas bottles and particularly solid fuel combustion chambers for guided missiles and similar, the geometry is essentially an elongated hollow cylinder.

The present invention also refers to a method for the manufacture of a pressure vessel according to the invention, in that a winding mandrel of the required geometry is first covered with the silicone elastomer, the surface of the silicon elastomer facing away from the winding mandrel is roughened, the surface of the silicone elastomer thus roughened is first provided with an etch primer and then with an adhesive film, the covering of silicone elastomer prepared in this way is then sheathed, using methods known from prior art, with fibres with a high mechanical and thermal resistance, and consisting of glass, silicone carbide, mullite, boron carbide, aramid and/or carbon aramid, preferably carbon, which are, or will be, impregnated with a thermosetting resin, preferably a polyphenol cyanate, and the resin is then cured at temperatures of approximately 220° C.

To cover the winding mandrel with the silicone elastomer, the silicon elastomer is present in suitable tubular form which is turned back over or pulled over the winding mandrel or similar form. As an alternative, the silicon coating could also be manufactured directly on the winding mandrel in that prefabricated silicon mats are placed around the winding mandrel and then directly vulcanised. The silicon mats, known as skins, in this case are 0.5 mm to 1 mm thick.

The surface of the silicon elastomer can be roughened mechanically, chemically, or, for example, by plasma etching. After roughing, the surface has to be cleaned as necessary, for example by rinsing with a solvent (acetone). The etch primer applied to it serves as a bonding agent or adhesion intensifying agent between the silicon surface and the adhesive film. For example, "Chemosil" from Henkel (Germany) is used. This is an elastomer bonding agent containing organic polymers in ethanol.

The intended adhesive film is applied in the form of a liquid adhesive or preferably as an adhesive film or a Prepreg. The adhesive film is provided with a backing fabric and the adhesive can be liquidised by heating. The Prepreg has a very high proportion of resin and a correspondingly low amount of fibre, with the fibres being intended as a backing fabric. Adhesive films or Prepregs are preferred because they enable a defined and desirable thickness of adhesive film to be achieved which cannot be achieved to the required degree with a liquid adhesive.

In a special embodiment, the sheathing of the silicone elastomer covering with the fibres can take place using the wet winding technique. In the process, fibres (in several layers) impregnated with the high-temperature resin are wound in a known manner around the silicone elastomer.

The sheathing of the silicone elastomer covering can also be achieved using Prepregs, i.e., using fibre mats already impregnated with the high-temperature resin. The fibre mats can also be arranged in several layers around the prepared silicone elastomer in order to achieve a required wall thickness, depending on the particular area of application.

In a suitable manner, the silicone elastomer covering can also be sheathed with dry fibre mats (also in several layers) which are then infiltrated with the high-temperature resin in a known manner.

The alignment of the fibre material is preferably uni-directional, crossed and/or multiaxial and combined to form a layer structure, with the individual layers being oriented corresponding to the stresses in the structure.

The method of sheathing with the fibres, i.e., the construction of the fibre composite material, should in this case not be particularly limited. In fact, all suitable methods known to the expert can be used.

An essential part of the method according to the invention is the preparation of the surface of the silicone elastomer, which is then to be brought into an adhesive bond with the fibre composite. This adhesive bond between the insulating layer and the inner surface of the housing is particularly important and in addition to the use of a silicone elastomer it plays an essential role in the context of the present invention as an inner insulation.

The invention is explained in the following with reference to the drawings. The drawings are as follows:

FIG. 1 A cross-section showing the construction of a pressure vessel according to the invention using a combustion chamber of a guided missile as an example.

Figure 2:
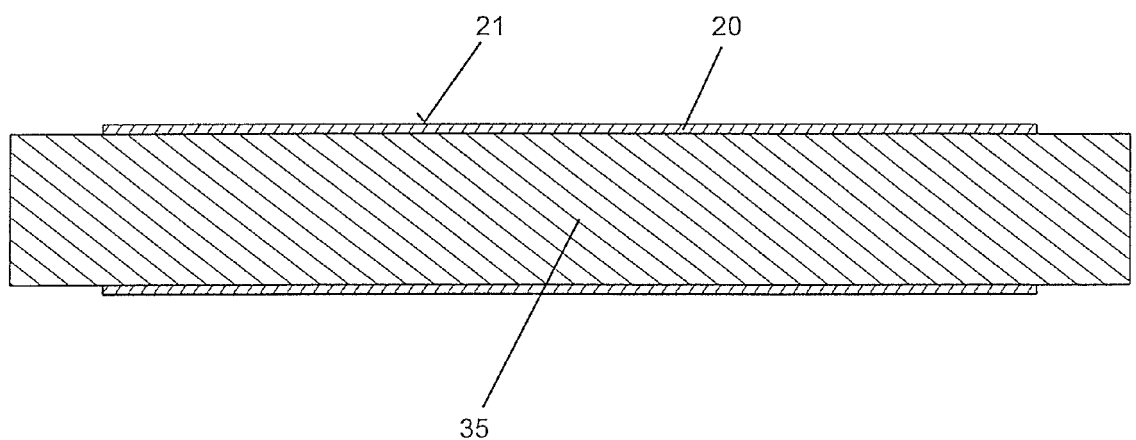

FIG. 2 A lengthwise section through a winding mandrel with a silicone liner arranged over it.

FIG. 1 is therefore a cross-section through a solid fuel combustion chamber for a guided missile. The pressure vessel 10 for a combustion chamber of this kind consists of the housing 15 and the inner insulating layer 20.

The housing 15 according to the invention preferably consists of reinforced fibres with a high mechanical and thermal resistance, which are fixed in a high-temperature resin as a matrix. It is preferably a carbon fibre reinforced plastic, CFK. The thickness of such a CFK housing can be between 1 mm and 15 mm depending upon the area of application. The housing 15 and therefore the outer casing of the vessel can, if applicable and if necessary, contain integral metal fittings such as control elements or similar and also, e.g., valve attachments or similar.

The insulating layer 20 has the properties and qualities described above. The additives used are not particularly limited provided they promote the high temperature stability of the material they are used to dope. The thickness of the silicone skin is between 0.5 and 10 mm.

The housing 15 and the insulating layer 20 are, as previously described, bonded together through their adjoining surfaces 16 and 21. The etch primer and adhesive layer are not shown in FIG. 1 because, naturally, they have only an insignificant thickness compared to the housing 15 and insulating layer 20.

The solid fuel 25 is arranged in the vessel. In the exemplary embodiment, the solid fuel 25 has star-shaped notches 30 to form a star burner, as it is called. This improves the combustion properties of the fuel 25 because the surface of the fuel is increased and a correspondingly faster combustion promoted. This arrangement accelerates the guided missile but is, however, not an object of the present invention.

FIG. 2 is a purely schematic representation showing the formation of the silicone skin 20 over a winding mandrel 35 and the position of the surface of the silicone skin 21 to be prepared.

Finally the advantages of an arrangement of a pressure vessel according to the invention, especially an arrangement of a solid fuel combustion chamber according to the invention, are summarised. These advantages are based on one hand on the housing of fibre composite material which has a high mechanical and thermal resistance and on the other hand on the insulating layer of gas-tight filled silicone elastomer. These features not only add the positive properties of a pressure vessel configured in this way but also have a synergistic effect.

The housing of high temperature resistant fibre composite material has more specific stiffness with less mass, which means that a guided missile made from it has a greater range, higher speed and improved agility or manoeuvrability due to the lower inertia. This also increases the hit probability.

The use of a high temperature resin for the fibre composite housing defuses the temperature problems, which result due to the high air friction when a guided missile is operated in the supersonic range.

The insulating layer of silicone elastomer enables the high temperatures required for curing a high temperature resin for the fibre composite housing of a solid fuel combustion chamber and also for a gas bottle or similar that can be used in the high temperature range. Because the insulating layer of silicone elastomer is gas-tight, an uncontrolled combustion of the fuel is avoided. The silicone elastomer absorbs the shrinkage of the solid fuel when hardening after being filled into the vessel (see above).

Furthermore, and this is where the synergy effect lies, the use of the silicone elastomer as an insulating layer leads to a significant improvement in the quality of the fibre composite housing. The thermal expansion of the silicone insulating layer during the curing of the fibre composite matrix in fact results in a pretensioning of the fibre layers. Fibres which were wound in the outer area, i.e. later, over the silicone covering become looser the further out they lie. The thermal expansion of the silicon covering causes these fibres to be tensioned. This effect leads to a fully hardened component that can more effectively absorb a load application.

The invention claimed is:

1. A pressure vessel (10) having high specific stiffness, consisting of a housing (15) and a layer of insulation (20) lining the inner surface (16) of the housing (15),
wherein the housing (15) is made from a mechanically and thermally high-strength fiber composite material that is composed of mechanically and thermally high-strength reinforcing fibers in a mechanically and thermally high-strength resin matrix and from a gas-tight filled silicon elastomer, and
wherein the layer of insulation (20) and the housing (15) are adhesively bonded, such that the pressure vessel is operable at a mean temperature of at least 200° C.

2. The pressure vessel of claim 1, wherein the fibers are chosen from carbon, glass, silicon carbide, mullite, boron carbide, aramid and/or carbon aramid fibers.

3. The pressure vessel of claim 2, wherein the fibers are carbon fibers.

4. The pressure vessel of claim 1, wherein the resin forming the resin matrix is a thermosetting resin.

5. The pressure vessel of claim 4, wherein the thermosetting resin is a polyphenol cyanate.

6. The pressure vessel of claim 1, wherein the silicone elastomer is fiber reinforced.

7. The pressure vessel of claim 1, wherein the silicone elastomer is filled with powdered silica.

8. The pressure vessel of claim 7, wherein the silicone elastomer has an expansibility of at least 3%.

9. The pressure vessel of claim 1, wherein said pressure vessel has an essentially elongated cylindrical geometry.

10. The pressure vessel of claim 1 in the form of a gas bottle.

11. The pressure vessel of claim 1 in the form of a solid fuel combustion chamber for guided missiles.

* * * * *